United States Patent
Dorenbosch et al.

(10) Patent No.: US 6,169,903 B1
(45) Date of Patent: Jan. 2, 2001

(54) METHOD AND APPARATUS IN A WIRELESS COMMUNICATION SYSTEM FOR DETERMINING A LOCATION AT WHICH A SUBSCRIBER UNIT IS POSITIONED

(75) Inventors: Jheroen Pieter Dorenbosch, Paradise; Slim Souissi, Fort Worth, both of TX (US)

(73) Assignee: Motorola, Inc., Schaumburg, IL (US)

(*) Notice: Under 35 U.S.C. 154(b), the term of this patent shall be extended for 0 days.

(21) Appl. No.: 09/217,775

(22) Filed: Dec. 21, 1998

(51) Int. Cl.[7] ............................................. H04B 7/00
(52) U.S. Cl. ..................... 455/458; 455/456; 455/517; 455/67.1
(58) Field of Search ................... 455/31.1, 31.2, 455/31.3, 38.1, 421, 422, 435, 456, 457, 458, 507, 517, 524, 67.1, 67.6; 370/432, 433, 442, 458, 459

(56) References Cited

U.S. PATENT DOCUMENTS

| | | | |
|---|---|---|---|
| 5,369,681 | * 11/1994 | Boudreau et al. | 455/458 |
| 5,475,863 | * 12/1995 | Simpson et al. | 455/458 |
| 5,845,213 | * 12/1998 | Sumner et al. | 455/517 |

* cited by examiner

*Primary Examiner*—Thanh Cong Le
(74) *Attorney, Agent, or Firm*—R. Louis Breeden (57) ABSTRACT

Sub-areas (506) within a coverage area of a wireless communication system are defined (702), and transmitters (502, 504) are positioned within the sub-areas. A memory (212, 314), in at least one of a subscriber unit (122) and a controller (112) of the system, is programmed (706) with unique transmitter identifiers (414) and corresponding transmitter locations; and a locator signal (406) is periodically transmitted (708) from the sub-areas during time slots (408) coordinated such that, within a sub-area, no more than one transmitter transmits during each time slot. The locator signal includes one of the unique transmitter identifiers for identifying the transmitter sending the locator signal. The subscriber unit monitors (710) the locator signal to determine propagation delays between the subscriber unit and the transmitters received; and one of the subscriber unit and the controller estimates (712) the location of the subscriber unit from the propagation delays and the transmitter locations corresponding to the unique transmitter identifiers received.

22 Claims, 4 Drawing Sheets

METHOD AND APPARATUS IN A WIRELESS COMMUNICATION SYSTEM FOR DETERMINING A LOCATION AT WHICH A SUBSCRIBER UNIT IS POSITIONED

FIELD OF THE INVENTION

This invention relates in general to wireless communication systems, and more specifically to a method and apparatus for determining a location at which a subscriber unit is positioned.

BACKGROUND OF THE INVENTION

Many forms of wireless communication systems are in use today. Both one-way (outbound only) systems, such as one-way paging systems, and two-way (outbound and inbound) systems, such as two-way messaging systems, abound. Subscriber unit position measurement is a desirable feature, as is a reliable estimation of the quality of the connection (Quality of Service) between the subscriber unit and the base station transmitters that are closest to the subscriber unit. The former opens the possibility of a large number of applications, and the latter forms the basis for optimized targeted delivery of messages.

A problem that exists in many of today's wireless communication systems is a lack of sufficiently accurate subscriber unit location determination and a further lack of adequate Quality of Service measurement. This problem is particularly severe in systems utilizing frequency shift keyed (FSK) modulation.

Thus, what is needed is a method and apparatus in a wireless communication system for determining a location at which a subscriber unit is positioned. Preferably, the method and apparatus will also provide an improved Quality of Service measurement. In addition, it is highly desirable that the method and apparatus be suitable for operation in FSK systems.

SUMMARY OF THE INVENTION

An aspect of the present invention is a method in a wireless communication system for determining a location at which a sub-scriber unit is positioned. The method comprises the steps of defining a plurality of sub-areas within a coverage area of the wireless communication system, and positioning a plurality of transmitters within ones of the plurality of sub-areas, each transmitter positioned at a transmitter location. The method further comprises the step of programming a memory, in at least one of the subscriber unit and a controller of the wireless communication system, with a plurality of unique transmitter identifiers and a corresponding plurality of transmitter locations; and periodically transmitting a locator signal from the plurality of sub-areas during a plurality of time slots coordinated such that, within a sub-area, no more than one transmitter transmits during each of the plurality of time slots, the locator signal comprising one of the plurality of unique transmitter identifiers for identifying a transmitter from which the locator signal is sent. The method further comprises the steps of monitoring, by the subscriber unit, the locator signal to determine a plurality of propagation delays between the subscriber unit and ones of the plurality of transmitters received; and estimating, by one of the subscriber unit and the controller, the location of the subscriber unit from the plurality of propagation delays and the plurality of transmitter locations corresponding to the plurality of unique transmitter identifiers received.

Another aspect of the present invention is a controller in a wireless communication system for facilitating a determination of a location at which a subscriber unit is positioned. The controller comprises a network interface for receiving a message, and a processing system coupled to the network interface for processing the message. The processing system comprises a memory programmed with a plurality of unique transmitter identifiers. The controller further comprises a base station interface coupled to the processing system for controlling a plurality of transmitters to transmit the message. The processing system is programmed to define a plurality of sub-areas within a coverage area of the wireless communication system, ones of the sub-areas including the plurality of transmitters, each transmitter positioned at a transmitter location; and to periodically control the plurality of transmitters to transmit a locator signal from the plurality of sub-areas during a plurality of time slots coordinated such that, within a sub-area, no more than one transmitter transmits during each of the plurality of time slots. The locator signal comprises one of the plurality of unique transmitter identifiers for identifying a transmitter from which the locator signal is sent.

Another aspect of the present invention is a subscriber unit in a wireless communication system for facilitating a determination of a location at which the subscriber unit is positioned. The subscriber unit comprises a receiver for receiving wirelessly transmitted information, and a processing system for processing the wirelessly transmitted information. The processing system is programmed to control the receiver to monitor a locator signal that is periodically transmitted from a plurality of transmitters within ones of a plurality of sub-areas defined within a coverage area of the wireless communication system, each transmitter positioned at a transmitter location. The locator signal is transmitted during a plurality of time slots coordinated such that, within a sub-area, no more than one transmitter transmits during each of the plurality of time slots. The locator signal comprises one of a plurality of unique transmitter identifiers for identifying a transmitter from which the locator signal is sent. The processing system is further programmed to determine from the locator signal a plurality of propagation delays between the subscriber unit and ones of the plurality of transmitters received.

DETAILED DESCRIPTION OF THE DRAWINGS

Figure 1:
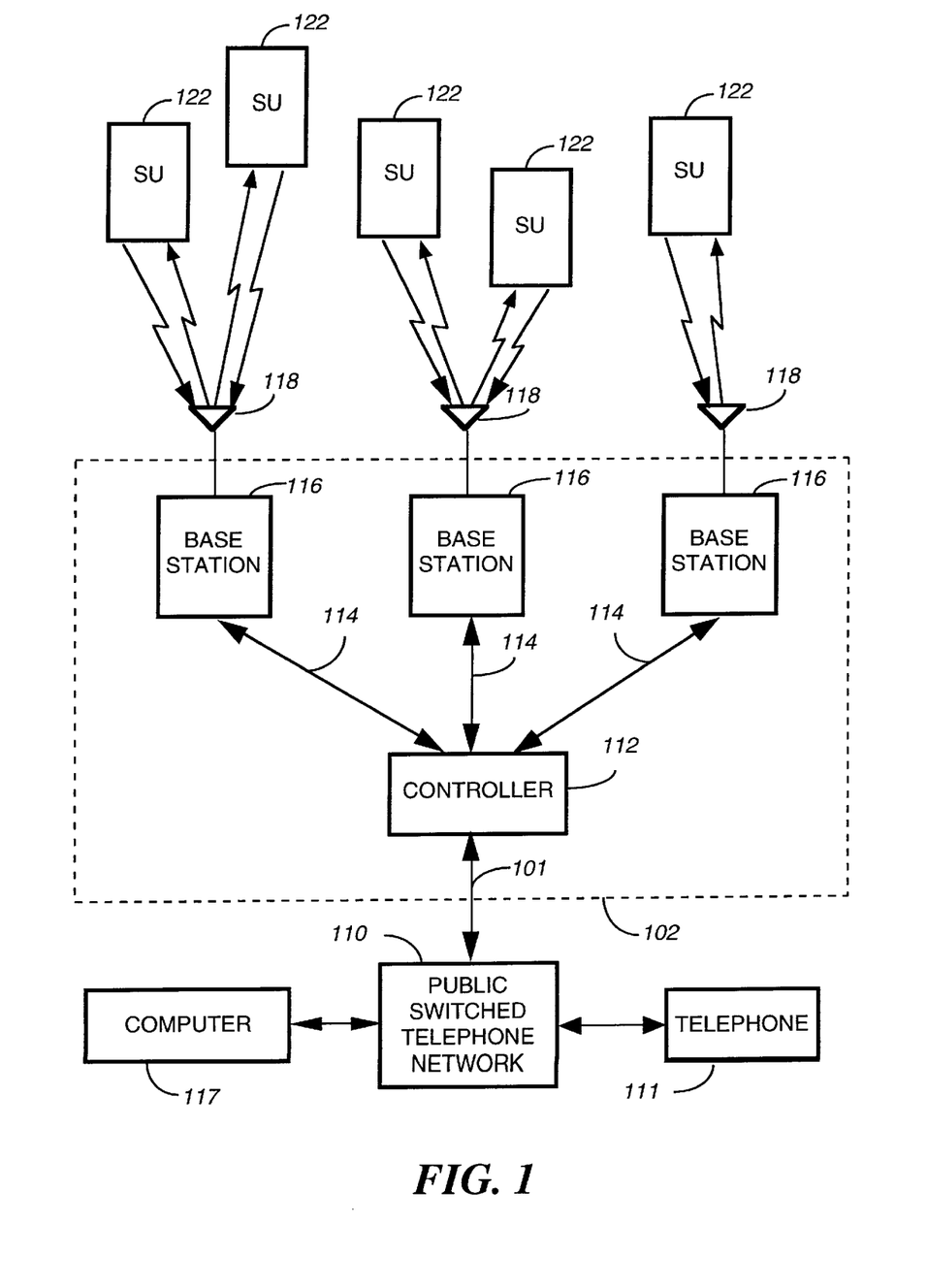
FIG. 1 is an electrical block diagram of an exemplary wireless communication system in accordance with the present invention.

Referring to FIG. 1, an electrical block diagram depicts an exemplary wireless communication system in accordance with the present invention, comprising an infrastructure portion 102 including a controller 112 and a plurality of conventional base stations 116, the communication system also including a plurality of subscriber units 122. The base stations 116 preferably communicate with the subscriber units 122 utilizing conventional radio frequency (RF) techniques, and are coupled by conventional communication links 114 to the controller 112, which controls the base stations 116.

The hardware of the controller 112 is preferably a combination of a Choreographer!® network management device, a Wireless Messaging Gateway (WMG™) Administrator!™ terminal, an RF-Usher!™ multiplexer, and an RF-Conductor!® message distributor manufactured by Motorola, Inc., and utilizes software modified in accordance with the present invention. The hardware of the base stations 116 is preferably a combination of the RF-Orchestra!™ transmitter and the RF-Audience!® receiver manufactured by Motorola, Inc. The subscriber units 122 are preferably similar to PageWriter® 2000 data subscriber units, also manufactured by Motorola, Inc., and also utilize software modified in accordance with the present invention. It will be appreciated that other similar hardware can be used as well for the controller 112, the base stations 116, and the subscriber units 122.

Each of the base stations 116 transmits RF signals to the subscriber units 122 via an antenna 118. The base stations 116 preferably each receive RF signals from the plurality of subscriber units 122 via the antenna 118. The RF signals transmitted by the base stations 116 to the subscriber units 122 (outbound messages) comprise selective call addresses identifying the subscriber units 122, and data messages originated by a message originator, as well as commands originated by the controller 112 for adjusting operating parameters of the radio communication system. The RF signals preferably transmitted by the subscriber units 122 to the base stations 116 (inbound messages) comprise responses that include scheduled messages, such as positive acknowledgments (ACKs) and negative acknowledgments (NAKs), and unscheduled messages, such as registration requests and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. While the preferred embodiment is a two-way wireless communication system, as depicted in FIG. 1, many aspects of the present invention also are applicable to a one-way wireless communication system, as well.

Figure 2:
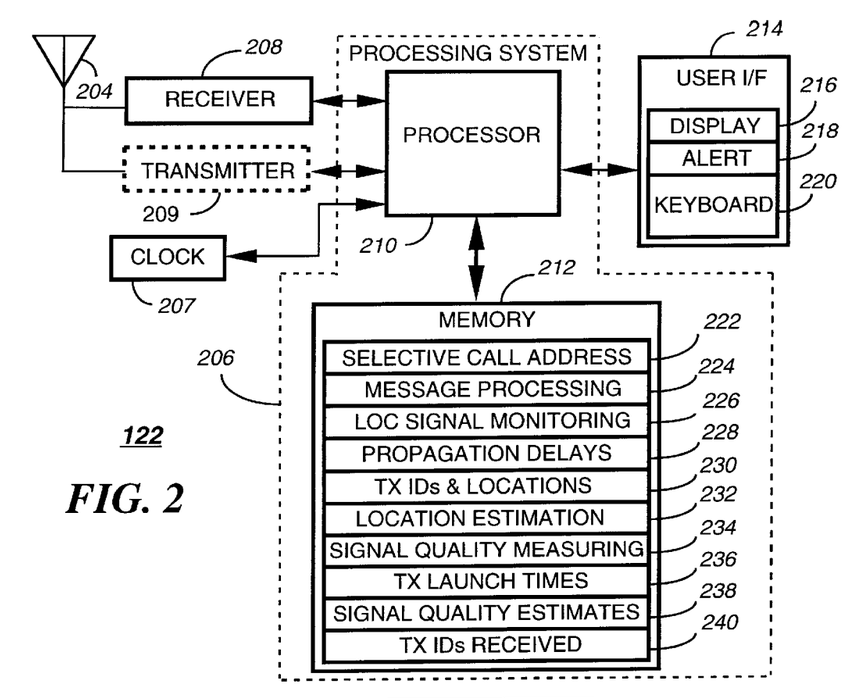
FIG. 2 is an electrical block diagram of an exemplary subscriber unit in accordance with the present invention.

FIG. 2 is an electrical block diagram of an exemplary subscriber unit 122 in accordance with the present invention. The subscriber unit 122 comprises an antenna 204 for intercepting an outbound message and for transmitting an inbound message. The antenna 204 is preferably coupled to a conventional receiver 208 for receiving the outbound message and is coupled to a conventional transmitter 209 for transmitting the inbound message. The receiver 208 and transmitter 209 are coupled to a processing system 206 for processing the outbound and inbound messages and for controlling the subscriber unit 122 in accordance with the present invention. A user interface 214 preferably is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the subscriber unit 122. A conventional clock 207 is also coupled to the processing system 206 for supporting time keeping requirements of the subscriber unit 122. It will be appreciated, when the present invention is applied to a one-way wireless communication system, that the transmitter 209 can be omitted.

The processing system 206 comprises a conventional processor 210 and a conventional memory 212. The memory 212 comprises software elements and data for programming the processing system 206 in accordance with the present invention. The memory 212 preferably includes a selective call address 222 to which the subscriber unit 122 is responsive. In addition, the memory 212 includes a message processing element 224 for programming the processing system 206 to process messages through well-known techniques. The memory 212 further comprises a location signal monitoring element 226 for programming the processing system 206 to control the receiver 208 to monitor a locator signal that is periodically transmitted from a plurality of base station transmitters within ones of a plurality of subareas defined within a coverage area of the wireless communication system. Each base station transmitter is positioned at a base station transmitter location, and the locator signal is transmitted during a plurality of time slots coordinated such that, within a sub-area, no more than one base station transmitter transmits during each of the plurality of time slots. The locator signal comprises one of a plurality of unique transmitter identifiers for identifying a base station transmitter from which the locator signal is sent. The memory 212 also includes a first storage space for a plurality of propagation delays 228 measured by the processing system 206 in cooperation with the receiver 208 during a transmission of the locator signal. In a first embodiment, the memory 212 includes a second storage space 230 for storing a plurality of base station transmitter identifiers and corresponding base station transmitter locations 230. In the first embodiment, the memory 212 further comprises a location estimation program 232 for programming the processing system 206 to determine from the locator signal a plurality of propagation delays between the subscriber unit 122 and ones of the plurality of base station transmitters received. The memory also includes a signal quality measuring program 234 for programming the processing system 206 to measure a signal quality of the locator signal received during the plurality of time slots. The signal quality measurements are used during location estimation to estimate the location of the subscriber unit 122 from information received only during ones of the plurality of time slots having a signal quality greater than a predetermined threshold. Preferably, the signal quality measurement represents a carrier-to-interference-plus-noise ratio (C/(I+N)) for each time slot, determined through well-known techniques, as described further below. Also, in the first embodiment, the memory 212 includes space for storing transmitter launch times 236, which apply to some systems in which there are known differences in the transmitter launch times 236. In addition, the memory 212 includes space for storing a plurality of signal quality estimates 238 made in accordance with the signal quality measuring program 234, as well as a plurality of transmitter identifiers received 240. Operation of the subscriber unit 122 in accordance with the present invention will be described in detail further below.

Figure 3:
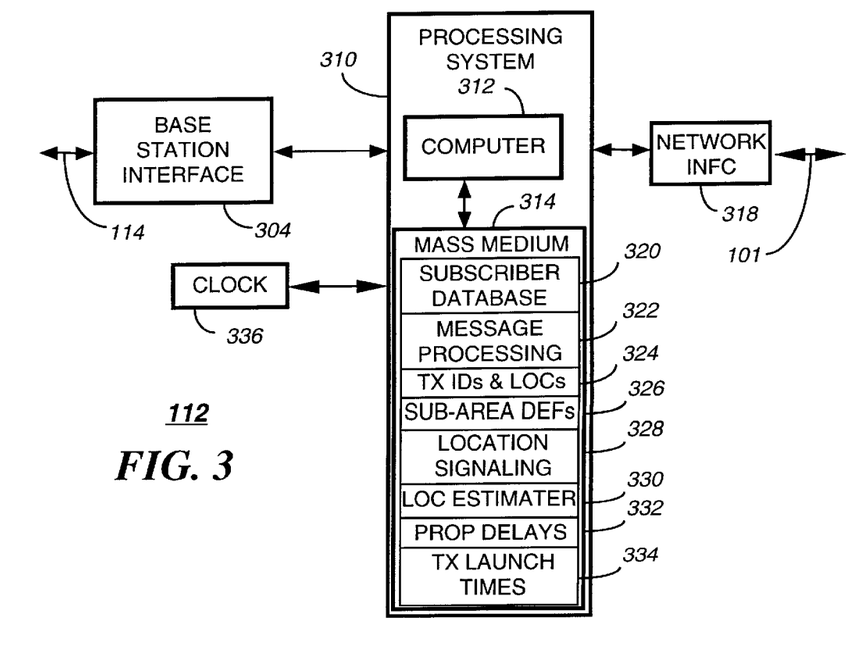
FIG. 3 is an electrical block diagram of an exemplary controller in accordance with the present invention.

FIG. 3 is an electrical block diagram depicting an exemplary controller 112 in accordance with the present invention. The controller 112 comprises a network interface 318 for receiving a message from a message originator via the telephone links 101. The network interface 318 is coupled to a processing system 310 for controlling and communicating with the network interface 318. The processing system is coupled to a base station interface 304 for controlling and communicating with the base stations 116 via the communication links 114. The processing system 310 is also coupled to a conventional clock 336 for providing a timing signal to the processing system 310. The processing system 310 comprises a conventional computer 312 and a conventional mass medium 314, e.g., a magnetic disk drive, programmed with information and operating software in accordance with the present invention. The mass medium 314 comprises a conventional subscriber database 320 for storing profiles defining service for subscribers using the system. The mass medium 314 further comprises a message processing element 322 for processing messages through well-known techniques.

In a second embodiment in accordance with the present invention, the mass medium 314 also includes space for storing a plurality of transmitter identifiers and a corresponding plurality of transmitter locations 324 for use in estimating the location of the subscriber unit 122. The mass medium 314 further comprises space for storing sub-area definitions 326 for defining a plurality of sub-areas within a coverage area of the wireless communication system, ones of the sub-areas including a plurality of transmitters, each transmitter positioned at a transmitter location. The mass medium 314 also includes a location signaling program 328 for programming the processing system 310 to periodically control the plurality of transmitters to transmit a locator signal from the plurality of sub-areas during a plurality of time slots coordinated such that, within a sub-area, no more than one transmitter transmits during each of the plurality of time slots, the locator signal comprising one of the plurality of unique transmitter identifiers for identifying a transmitter from which the locator signal is sent. In the second embodiment, the mass medium 314 includes a location estimater program 330 for programming the processing system 310 to cooperate with a base station receiver to receive, via the base station interface 304, a plurality of propagation delays measured by the subscriber unit 122 between the subscriber unit 122 and ones of the plurality of transmitters received, along with a corresponding received plurality of unique transmitter identifiers. The processing system 310 then estimates the location of the subscriber unit 122 from the plurality of propagation delays and the plurality of transmitter locations corresponding to the received plurality of unique transmitter identifiers. The mass medium 314 further comprises space for storing the plurality of propagation delays 332 received from the subscriber unit 122. In addition, the mass medium 314 includes space for storing a plurality of transmitter launch times 334, which the controller periodically sends to the subscriber unit 122 for estimating the location of the subscriber unit 122 in the first embodiment. In the second embodiment, the processing system 310 does not send the transmitter launch times 334 to the subscriber unit 122, but instead uses the transmitter launch times 334 itself for estimating the location of the subscriber unit 122. Operation of the controller 112 in accordance with the present invention will be described further below.

Figure 4:
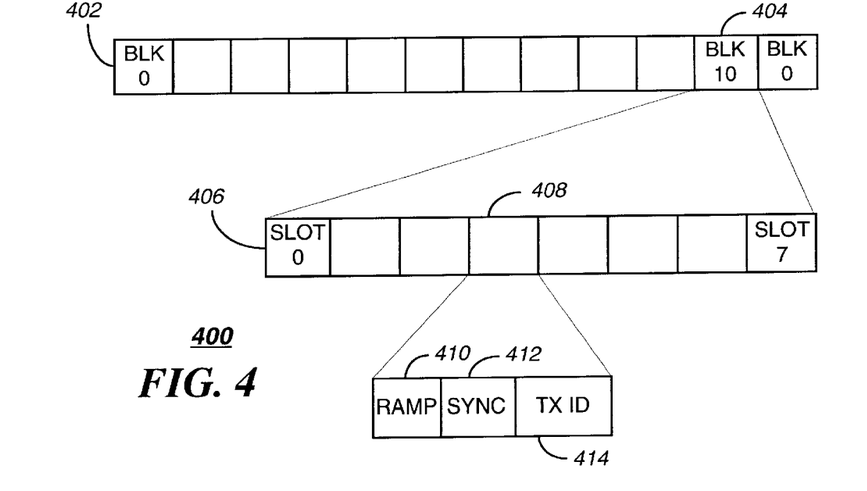
FIG. 4 is a frame structure diagram of an exemplary frame of data in accordance with the present invention.

FIG. 4 is a frame structure diagram 400 depicting an exemplary frame 402 of data in accordance with the present invention. In one embodiment, the present invention utilizes the last block 404 in the frame 402 for sending a locator signal 406. The preceding blocks in the frame 402 preferably are simulcast so the subscriber units 122 can easily remain synchronized to the channel. For example, a preferred frame in a system utilizing the FLEX™ family of communication protocols is the System Configuration Information (SCI) base frame, because all subscriber units 122 monitor it.

A new Block Information Word (BIW) preferably is created, using well-known techniques in accordance with the communication protocol, for telling the subscriber units 122 when the frames containing the locator signal 406 will appear. The BIW can also be used to vary the bit rate of these frames. In one embodiment, the locator signal 406 is divided into 8 time slots 408 (numbered, for example, 0–7). Each time slot contains 32 bit positions. The bit positions preferably are used as a ramp 410 for transmitter power up/down stability acquisition, a sync 412 for synchronizing the subscriber unit 122 through well-known techniques, and a transmitter identifier 414 for uniquely identifying the base station transmitter being received. During a time slot 408 only some transmitters are keyed; all others are silent. It will be appreciated that, alternatively, other numbers of slots and bit positions per slot can be utilized, as well, in accordance with the present invention.

Figure 5:
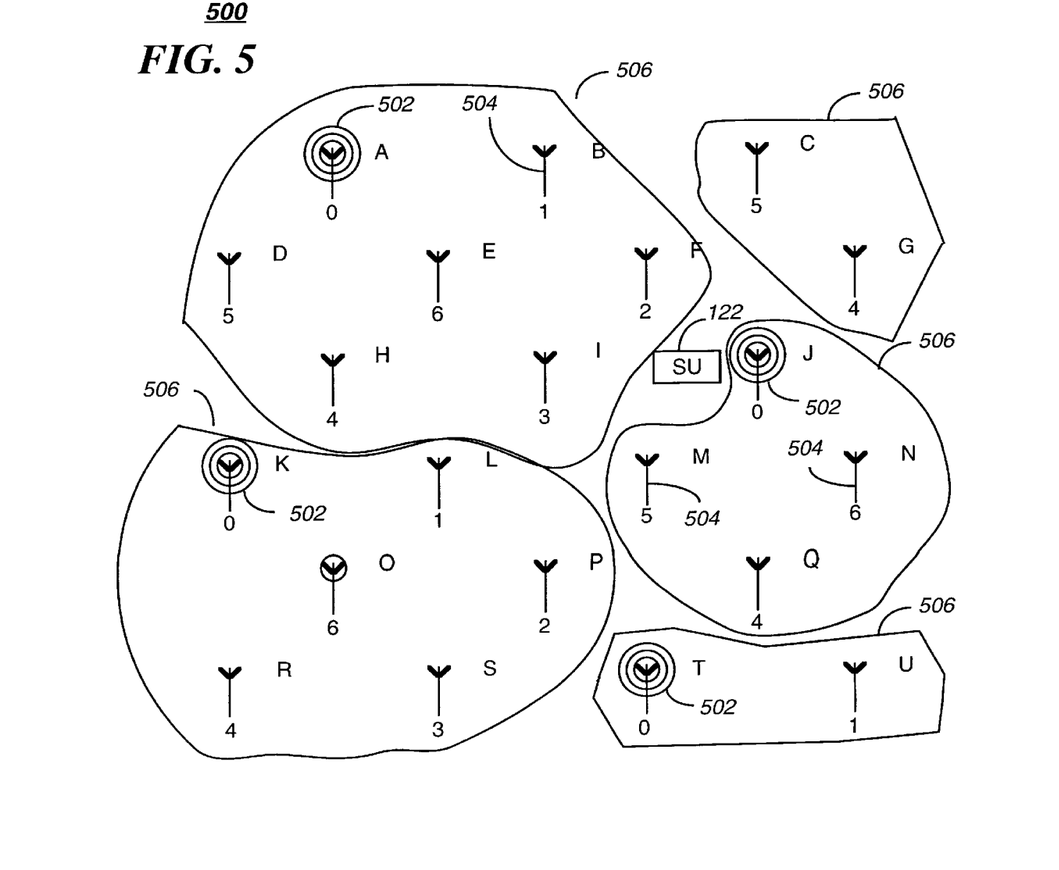
FIG. 5 is a first transmitter layout and operation diagram depicting an exemplary coverage area in accordance with the present invention.

FIG. 5 is a first transmitter layout and operation diagram 500 depicting an exemplary coverage area and transmitter operation during time slot 0 in accordance with the present invention. The coverage area has been divided into a plurality of sub-areas 506 having a plurality of transmitting transmitters 502 and non-transmitting transmitters 504 positioned therein. The transmitters 502, 504 preferably are assigned to the first seven time slots of the locator signal 406 in a conventional seven-fold reuse pattern. The eighth time slot can be useful in non hexagonal transmitter arrangements. The transmitters 502, 504 are assigned unique transmitter identifiers (A–U) and reused time slot numbers (0–6). Transmitters having sub-stantially corresponding transmitter locations relative to each of the plurality of sub-areas, i.e., relative to the reuse pattern, are assigned identical time slot numbers, so that the transmitters will transmit in synchronism during their assigned time slot. For example, during time slot 0, the transmitters 502 transmit in synchronism (as indicated by the "ring patterns" radiating from the transmitters 502).

During each time slot the subscriber unit 122 preferably performs the following operations:

1. Sync detection. The subscriber unit 122 checks whether a suitable signal is being transmitted.
2. Automatic Frequency Control (AFC). If a signal is found, the subscriber unit 122 may have to adjust its AFC, because not all transmitters transmit on the same frequency.
3. Precision timing measurement. The subscriber unit 122 makes a precise measurement of the relative arrival time of the signals during the time slots. The subscriber unit 122 preferably uses the transitions in the sync and in the transmitter identifier (ID) to maintain accuracy in its timing reference. As timing reference the subscriber unit 122 preferably averages the timing of the signals in the first 10 blocks of the frame 402. What is measured is the relative time of arrival of the locator signal 406 measured in each time slot. Over the duration of the block, a timing stability that is much better than 1 microsecond is preferred.

4. C/(I+N) measurement. The subscriber unit 122 checks whether the transmitter ID is consistent with one coming from a single transmitter. Then, a C/(I+N) estimate is made. Advantageously, the subscriber unit 122 can accurately estimate C/(I+N) using the orthogonality of the transmitter IDs. The IDs are chosen to be orthogonal and to have error detection and correction capability, using well-known techniques. When the subscriber unit 122 detects errors in the ID that can not be corrected, it concludes that the C/(I+N) is bad. When no errors occur, the subscriber unit 122 can subtract the theoretical transmitter ID signal from the ID range in the decoded signal. The remaining signal is an estimate of I+N. When errors occur but can be corrected, the subscriber unit 122 can again use the above method. In this case a substantial I+N contribution will be present.

Figure 6:
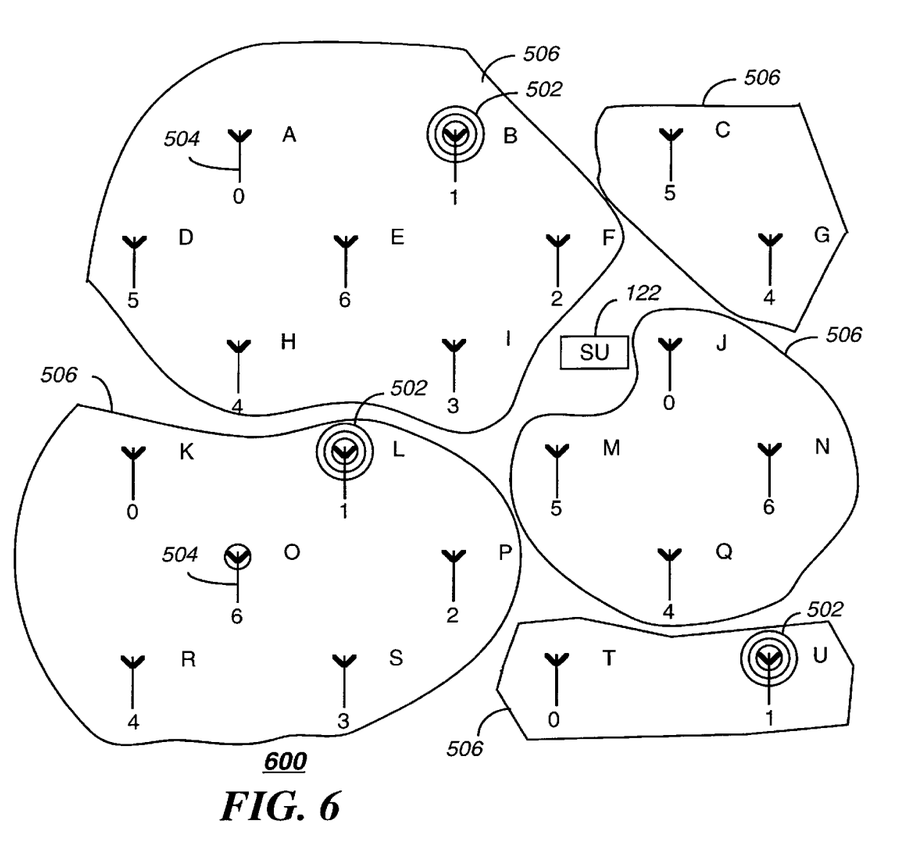
FIG. 6 is a second transmitter layout and operation diagram in accordance with the present invention.

During each time slot, only the transmitters assigned to the time slot key on and send the required bit pattern. Referring again to FIG. 5, during the first time slot, time slot 0, the subscriber unit 122 will only see the pattern from the nearby transmitter J. It can measure the arrival time with good precision. As is shown in FIG. 6, which depicts transmitter operation during the second time slot, time slot 1, the subscriber unit 122 is about equally far from several transmitting transmitters 502. During this time slot the subscriber unit 122 receives different transmitter IDs with about equal strength. The subscriber unit 122 can determine that this time slot is not very useful for position measurement. The time slot's sync 412 will be delayed with respect to the sync in time slot 0, but the transmitter ID 414 will be hard to measure. Time slot 1 thus is not useful for position measurement of the subscriber unit 122 located near transmitter J.

In our example, the subscriber unit 122 might measure the relative arrival times and C/(I+N) values shown in Table 1. The RSSI column is optional and can be used to optimize message targeting. If the transmitter

TABLE 1

| SLOT | XMITTER ID | RELATIVE ARRIVAL TIME (μs) | C/(I + N) | OPTIONAL RSSI |
|---|---|---|---|---|
| 0 | J | 2 | excellent | best |
| 1 | ? | 10 | bad | low |
| 2 | F | 0 | excellent | very high |
| 3 | I | 6 | OK | high |
| 4 | G | 8 | OK | medium |
| 5 | M | 12 | OK | medium |
| 6 | ? | 10 | bad | low |
| 7 | ? | none | N/A | N/A | launch times are accurate, the subscriber unit 122 will conclude that it is near transmitters J, F, I and G. It is 600 meters (m) closer to transmitter F than to transmitter 0, and 1800 m closer to transmitter F than to transmitter I, and so forth. It should be appreciated that the method also works if the subscriber unit 122 is outside the edge of one of the sub-areas 506. The subscriber unit 122 preferably also uses the C/(I+N) estimates. The subscriber unit 122 will not report a high quality if the best transmitter has a bad C/(I+N). Alternatively, if the subscriber unit 122 would measure received signal strength indication (RSSI), it could do an even better job. It would be able to take into account different power used by different transmitters, and different path losses. As a further alternative, the system could get much more detailed information by making the subscriber unit 122 report the full Table 1 or the four entries with the best C/(I+N). This would need the transfer of a fair amount of data: 24[32 with RSSI], or 16 [20] small integers. Most of these integers could be communicated in a single byte or a part of a byte.

Even when launch times of the base stations are not well controlled, the wireless communication system may be able to measure and report the launch times. Using well-known techniques, e.g., Global Satellite System (GPS) time measurement, each transmitter preferably would determine the difference between the actual launch time of its time slot, and the ideal launch time. It would report the difference to the controller 112.

Position determination has several aspects. One aspect is launch time precision. If a subscriber unit 122 knows the precision of the launch times at the transmitters, it can compute the accuracy of the position estimates. Several options exist, depending upon the accuracy desired:

1. The system transmits no information on the precision of the launch times at the transmitters. A default sigma (standard deviation) is programmed in the subscriber unit 122. The subscriber unit 122 determines the location with an error derived from the programmed sigma. Resolutions of Order(kilometers) for one-way subscriber units 122 can be obtained using this option.

2. The system transmits the sigma of accuracy of the launch times at the transmitters. The subscriber unit 122 determines the location with an error derived from the transmitted sigma. This would also work fine in systems desiring resolutions of Order(kilometers).

3. The system transmits the deviations from the ideal launch times for all transmitters. The subscriber unit 122 now can reach position resolutions of Order(one-hundred meters) in the example implementation.

Another aspect of position determination concerns local geometry. A subscriber unit 122 must know the coordinates of the transmitters. This can be accomplished in at least two different ways, depending on traffic capacity and memory required in the subscriber unit 122:

1. The subscriber unit 122 uses transmitter coordinates (longitude and latitude) pre-programmed in the memory 212, as function of transmitter ID, and other suitable system and service provider IDs. An advantage of this technique is that the subscriber unit 122 knows its location immediately after receiving the locator signal. A disadvantage is that the subscriber unit 122 can need a lot of memory capacity if it is to operate in more than one zone.

2. The wireless communication system, from time to time, transmits the coordinates of the transmitters in the local coverage area. This would typically be done through a well-known technique, such as Motorola's FLEX™ Suite of Application Protocols, for protocol independence. Advantages of this technique are that it reduces memory requirements in the subscriber unit 122, and it supports topology changes in the system. Disadvantages are that it requires a fair amount of air time capacity on the outbound channel(s), and that the subscriber unit 122 does not know where it is before it receives the relevant transmitter coordinates.

The above described techniques work for one-way and two-way wireless communication systems. With two way wireless communication systems, several additional techniques are possible:

1. A device in the fixed portion of wireless communication system, e.g., the controller 112, receives the Transmitter IDs, Relative Arrival Times, C/(I+N) values, and (optionally) RSSI from the subscriber unit 122. The controller 112 combines these with knowledge about transmitter coordinates, launch time precision, and deviations in transmitter launch times. The controller 112 now can compute the location of the subscriber unit 122 (and the best transmitters and reuse factor that can used for targeted message delivery).

2. When a subscriber unit 122 wants to know its location it sends a short request to the controller 112, preferably using the FLEX™ Suite of Application Protocols. The controller 112 then receives the measurements of the subscriber unit 122, as above. The controller 112 computes the coordinates of the subscriber unit 122 and sends the result to the subscriber unit 122, again preferably using the FLEX™ Suite of Application Protocols.

3. Localization can be further improved within the system by combining the measurements from the subscriber unit 122 with the localization information obtained when the base station receivers receive the inbound packets from the subscriber unit 122.

Prior art localization methods have uses frequency diversity to reduce problems related to multi-path. Multi-path complicates distance measurements because one can confuse a longer scattered path with a line-of-sight measurement. Spreading the signal in frequency (e.g., Direct Sequence Spread Spectrum) can alleviate this problem, since scattering depends on frequency and at some frequency the line of sight path may be strongest.

An attractive alternative to Direct Sequence Spread Spectrum is the following:

1. The wireless communication system transmits the locator signal 406 on more than one channel. Each base station transmitter uses the same transmitter ID on each of the channels. Time slot assignments are reused as well.

2. The wireless communication system uses BIWs to inform the subscriber units 122 which channels have frames containing locator signals.

3. The subscriber units 122 take measurements, closely spaced in time, on more than one channel. If different distances are measured for the same transmitter, the subscriber unit 122 takes the shortest one. As part of a C/(I+N) measurement, after subtraction of a transmitter ID, the subscriber unit 122 may find a residual signal that again represents the same transmitter ID, that is shifted in time. In that case, it can detect multi-path and either reject the measurement, or even better, use the earlier of the detected signals.

Figure 7:
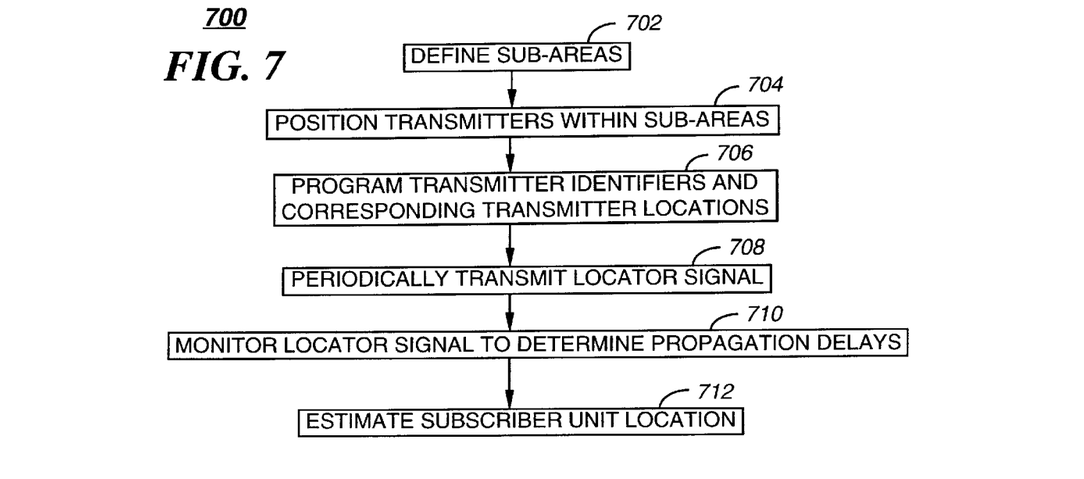
FIG. 7 is a flow diagram summarizing operation of the wireless communication system in accordance with the present invention.

FIG. 7 is a flow diagram summarizing operation of the wireless communication system in accordance with the present invention. First, the sub-areas 506 are defined 702 within the coverage area of the wireless communication system. Then a plurality of transmitters 502, 504 are positioned 704 within ones of the plurality of sub-areas, each transmitter positioned at a transmitter location. A memory in one of the subscriber unit 122 and the controller 112, or both, is then programmed 706 with a plurality of unique transmitter identifiers and a corresponding plurality of transmitter locations.

For the case that the memory 212 of the subscriber unit 122 is programmed with the plurality of unique transmitter identifiers and the corresponding plurality of transmitter locations, the memory 212 can be programmed in one of two ways. In one embodiment, the controller 112 periodically sends the plurality of unique transmitter identifiers and the corresponding plurality of transmitter locations to the subscriber unit, preferably using well-known over-the-air (OTA) messaging techniques. In another embodiment, the memory 212 is pre-programmed with the plurality of unique transmitter identifiers and the corresponding plurality of transmitter locations, preferably at the time service is initiated for the subscriber unit 122.

For the case that the memory (mass medium 314) of the controller 112 is programmed with the plurality of unique transmitter identifiers and the corresponding plurality of transmitter locations, and further when the wireless communication system is a two-way system and the subscriber unit 122 includes a transmitter 209 for sending information to the controller 112, the subscriber unit 122 advantageously is not required to store the plurality of unique transmitter identifiers and the corresponding plurality of transmitter locations. This embodiment is described further below.

The controller 112 thereafter periodically controls the base station transmitters to transmit 708 the locator signal 406 from the plurality of sub-areas 506 during a plurality of time slots 408 coordinated such that, within a sub-area 506, no more than one transmitter 502, 504 transmits during each of the plurality of time slots 408, the locator signal comprising one of the plurality of unique transmitter identifiers 414 for identifying a transmitter 502, 504 from which the locator signal 406 is sent. It will be appreciated that the controller 112 preferably synchronizes the plurality of time slots of the plurality of sub-areas with one another, using well-known techniques; and transmits the locator signal 406 from transmitters 502, 504 having substantially corresponding transmitter locations relative to each of the plurality of sub-areas, during each of the plurality of time slots. For example, when a standard seven-transmitter frequency reuse pattern is used (as depicted in FIGS. 5 and 6), then during each of seven time slots, transmitters having corresponding positions in the frequency reuse pattern transmit a portion of the locator signal 406 corresponding to the time slot.

During each time slot 408 the subscriber unit 122 monitors 710 the locator signal 406 to determine and store in the memory 212 a plurality of propagation delays 228 between the subscriber unit 122 and ones of the plurality of transmitters 502, 504 received. While monitoring, the subscriber unit 122 preferably also measures and stores a signal quality estimate 238 (preferably C/(I+N), as described herein above) of the portions of the locator signal 406 received during the plurality of time slots 408. In addition, the subscriber unit 122 stores the unique transmitter identifiers 414 received.

Next, the location of the subscriber unit 122 is estimated 712 from the plurality of propagation delays and the plurality of transmitter locations corresponding to the plurality of unique transmitter identifiers 414 received, through well-known techniques for determining location from differential propagation delays and known transmitter positions. Preferably, the location estimation is made from information received only during ones of the plurality of time slots 408 having a signal quality estimate 238 greater than a predetermined threshold, e.g., the four highest C/(I+N) values measured. In the first embodiment, the subscriber unit 122 itself performs the location estimation. In the second embodiment, the subscriber unit 122 transmits the plurality of propagation delays and the corresponding plurality of unique transmitter identifiers 414 received to the controller 112, which then estimates the location of the subscriber unit 122 from the plurality of propagation delays and the corresponding plurality of unique transmitter identifiers 414.

It will be appreciated that, in systems in which the launch times (relative to each time slot 408) of the plurality of transmitters 502, 504 differ by a plurality of known amounts, the device (subscriber unit 122 or controller 112) performing the location estimation preferably adjusts the plurality of propagation delays in accordance with the plurality of known amounts. It will be further appreciated that, to improve location estimation in the presence of multipath distortion, a first transmission of the locator signal 406 can be sent on a first channel, and a second transmission of the locator signal 406 can be sent on a second channel different from the first channel. Then, after monitoring the locator signals 406 on the first and second channels, the subscriber unit 122 can select for each of the plurality of propagation delays a shorter one of a first propagation delay measured on the first channel and a second propagation delay measured on the second channel.

Thus, it should be clear from the preceding disclosure that the present invention provides a method and apparatus in a wireless communication system for determining a location at which a subscriber unit is positioned. Advantageously, the method and apparatus also provides an improved Quality of Service measurement. In addition, the method and apparatus can operate in FSK systems, which is a highly desirable feature.

Many modifications and variations of the present invention are possible in light of the above teachings. Thus, it is to be understood that, within the scope of the appended claims, the invention can be practiced other than as specifically described herein above.

What is claimed is:

1. A method in a wireless communication system for determining a location which a subscriber unit is positioned, the method comprising the steps of:
   defining a plurality of sub-areas within a coverage area of the wireless communication system;
   positioning a plurality of transmitters within ones of the plurality of sub-areas, each transmitter positioned at a transmitter location;
   programming a memory, in at least one of the subscriber unit and a controller of the wireless communication system, with a plurality of unique transmitter identifiers and a corresponding plurality of transmitter locations;
   periodically transmitting a locator signal from the plurality of sub-areas during a plurality of time slots coordinated such that, within a sub-area, no more than one transmitter transmits during each of the plurality of time slots, the locator signal comprising one of the plurality of unique transmitter identifiers for identifying a transmitter from which the locator signal is sent;
   monitoring, by the subscriber unit, the locator signal to determine a plurality of propagation delays between the subscriber unit and ones of the plurality of transmitters received; and
   estimating, by one of the subscriber unit and the controller, the location of the subscriber unit from the plurality of propagation delays and the plurality of transmitter locations corresponding to the plurality of unique transmitter identifiers received.

2. The method of claim 1, wherein the transmitting step comprises the steps of:
   synchronizing the plurality of time slots of the plurality of sub-areas with one another; and
   transmitting the locator signal from transmitters having substantially corresponding transmitter locations relative to each of the plurality of sub-areas, during each of the plurality of time slots.

3. The method of claim 1,
   wherein the monitoring step comprises the step of measuring a signal quality of the locator signal received during the plurality of time slots, and
   wherein the estimating step comprises the step of estimating the location of the subscriber unit from information received only during ones of the plurality of time slots having a signal quality greater than a predetermined threshold.

4. The method of claim 1,
   wherein launch times of the plurality of transmitters differ by a plurality of known amounts, and
   wherein the method comprises, before the estimating step, the step of adjusting the plurality of propagation delays in accordance with the plurality of known amounts.

5. The method of claim 1, wherein the programming step comprises the step of periodically sending the plurality of unique transmitter identifiers and the corresponding plurality of transmitter locations from the controller to the subscriber unit.

6. The method of claim 1, wherein the programming step comprises the step of pre-programming the memory in the subscriber unit with the plurality of unique transmitter identifiers and the corresponding plurality of transmitter locations.

7. The method of claim 1,
   wherein the subscriber unit includes a transmitter for sending information to the controller, and
   wherein the estimating step includes the steps of:
      sending from the subscriber unit to the controller the plurality of propagation delays and the corresponding plurality of unique transmitter identifiers received; and
      estimating, by the controller, the location of the subscriber unit, from the plurality of propagation delays and the corresponding plurality of unique transmitter identifiers.

8. The method of claim 1,
   wherein the transmitting step comprises the steps of:
      sending a first transmission of the locator signal on a first channel; and
      then sending a second transmission of the locator signal on a second channel different from the first channel, and
   wherein the monitoring step comprises the step of
      selecting for each of the plurality of propagation delays a shorter one of a first propagation delay measured on the first channel and a second propagation delay measured on the second channel.

9. A controller in a wireless communication system for facilitating a determination of a location at which a subscriber unit is positioned, the controller comprising:
   a network interface for receiving a message;
   a processing system coupled to the network interface for processing the message, the processing system comprising a memory programmed with a plurality of unique transmitter identifiers; and
   a base station interface coupled to the processing system for controlling a plurality of transmitters to transmit the message, wherein the processing system is programmed to:
define a plurality of sub-areas within a coverage area of the wireless communication system, ones of the plurality of sub-areas including the plurality of transmitters, each transmitter positioned at a transmitter location; and
periodically control the plurality of transmitters to transmit a locator signal from the plurality of sub-areas during a plurality of time slots coordinated such that, within a sub-area, no more than one transmitter transmits during each of the plurality of time slots, the locator signal comprising one of the plurality of unique transmitter identifiers for identifying a transmitter from which the locator signal is sent.

10. The controller of claim 9, wherein the processing system is further programmed to:
synchronize the plurality of time slots of the plurality of sub-areas with one another; and
transmit the locator signal from transmitters having substantially corresponding transmitter locations relative to each of the plurality of sub-areas, during each of the plurality of time slots.

11. The controller of claim 9, wherein the processing system is further programmed to periodically send the plurality of unique transmitter identifiers and a corresponding plurality of transmitter locations to the subscriber unit.

12. The controller of claim 9,
wherein the processing system is further programmed to:
send a first transmission of the locator signal on a first channel; and
then send a second transmission of the locator signal on a second channel different from the first channel.

13. The controller of claim 9,
wherein the memory is further programmed with a plurality of transmitter locations corresponding to the plurality of unique transmitter identifiers, and
wherein the processing system is further programmed to:
cooperate with a base station receiver to receive a plurality of propagation delays measured by the subscriber unit between the subscriber unit and ones of the plurality of transmitters received, along with a corresponding received plurality of unique transmitter identifiers; and
estimate the location of the subscriber unit from the plurality of propagation delays and the plurality of transmitter locations corresponding to the received plurality of unique transmitter identifiers.

14. The controller of claim 13,
wherein launch times of the plurality of transmitters differ by a plurality of known amounts, and
wherein the processing system is further programmed to adjust the plurality of propagation delays in accordance with the plurality of known amounts.

15. A subscriber unit in a wireless communication system for facilitating a determination of a location at which the subscriber unit is positioned, the subscriber unit comprising:
a receiver for receiving wirelessly transmitted information; and
a processing system for processing the wirelessly transmitted information,
wherein the processing system is programmed to control the receiver to monitor a locator signal that is periodically transmitted from a plurality of transmitters within ones of a plurality of sub-areas defined within a coverage area of the wireless communication system, each transmitter positioned at a transmitter location, the locator signal transmitted during a plurality of time slots coordinated such that, within a sub-area, no more than one transmitter transmits during each of the plurality of time slots, the locator signal comprising one of a plurality of unique transmitter identifiers for identifying a transmitter from which the locator signal is sent, and
wherein the processing system is further programmed to determine from the locator signal a plurality of propagation delays between the subscriber unit and ones of the plurality of transmitters received.

16. The subscriber unit of claim 15,
wherein the processing system comprises a memory programmed with a plurality of unique transmitter identifiers and a corresponding plurality of transmitter locations, and
wherein the processing system is further programmed to estimate the location of the subscriber unit from the plurality of propagation delays and the plurality of transmitter locations corresponding to the plurality of unique transmitter identifiers received.

17. The subscriber unit of claim 15,
wherein the processing system is further programmed to:
measure a signal quality of the locator signal received during the plurality of time slots, and
estimate the location of the subscriber unit from information received only during ones of the plurality of time slots having a signal quality greater than a predetermined threshold.

18. The subscriber unit of claim 15,
wherein launch times of the plurality of transmitters differ by a plurality of known amounts, and
wherein the processing system is further programmed to adjust the plurality of propagation delays in accordance with the plurality of known amounts.

19. The subscriber unit of claim 15, wherein the processing system is further programmed to control the subscriber unit to periodically receive and store the plurality of unique transmitter identifiers and a corresponding plurality of transmitter locations from a controller.

20. The subscriber unit of claim 15,
wherein the processing system comprises a memory, and
wherein the memory is pre-programmed with the plurality of unique transmitter identifiers and a corresponding plurality of transmitter locations.

21. The subscriber unit of claim 15,
wherein the subscriber unit includes a transmitter for sending information to a controller, and
wherein the processing system is further programmed to send from the subscriber unit to the controller the plurality of propagation delays and a corresponding plurality of unique transmitter identifiers received.

22. The subscriber unit of claim 15,
wherein the processing system is further programmed to:
control the subscriber unit to receive a first transmission of the locator signal on a first channel;
then control the subscriber unit to receive a second transmission of the locator signal on a second channel different from the first channel; and
select for each of the plurality of propagation delays a shorter one of a first propagation delay measured on the first channel and a second propagation delay measured on the second channel.

* * * * *